3,697,277
 NONGLARE PHOTOGRAPHIC PRINTS
Frank O. King, Bartlesville, Okla., assignor to Phillips
            Petroleum Company
No Drawing. Filed Aug. 14, 1969, Ser. No. 850,222
            Int. Cl. G03c 5/26
U.S. Cl. 96—50 PL                         9 Claims

ABSTRACT OF THE DISCLOSURE

The invention comprises a nonglare reflective type photographic print and a method of preparing the same. The article is prepared by applying a protective coating of polyester film having a matte surface on the surface of a reflective type photographic print.

BACKGROUND OF THE INVENTION

Field of the invention

This invention relates to photographic prints. In a further aspect, the invention relates to an article of manufacture comprising a photographic print having permanently bonded thereto a protective, nonglare coating of polyester film. In a further aspect it relates to a method of preparing the composite photographic print-polyester film.

Description of the prior art

The use of photographs in the field of advertising has increased in recent years. In applications in which photographs are used for display purposes, certain problems have arisen. Many of these problems are caused by basic deficiencies in the photographic image itself. For example, in order to insure a relatively permanent record the image carrying layer of the photograph has become increasingly hard. In display type advertising, photographs are often subjected to direct illumination which results in reflection of light from the hard image layer. This phenomenon is commonly called "glare." Another problem is that the hard image layer of the photograph is susceptible to deterioration by such agents as water, mild chemical solutions (such as sweat from the human hand), dirt, grease, and the like. A slower type of deterioration of the picture occurs on exposure of the image layer of the print to actinic light. The dyes in the color photograph are photochemically active in the sense that light tends to fade the original intensity of the dyes. The rapidity of the deterioration of the color dyes is increased due to the fact that atmospheric oxygen is available to aid in degradation of the image layer.

Another problem encountered in the photographs of the prior art has been that in display advertising it is desirable to mount the photographic prints on a flat surface. A problem has arisen because of the fact that reflective type photographic prints have a tendency to "curl". Curling is a phenomenon encountered in drying prints wherein the print tends to assume a tubular shape. If the print curls in such a way that the image layer forms the inside surface of the tube (front curl), then mounting of the print in a flat configuration is extremely difficult. The edges of the print tend to rise off the mounting surface and assume the original tubular shape. However, if the print has a back curl (image layer being the outside surface of the tube), the problem of flat mounting for display purposes is avoided.

OBJECTS OF THE INVENTION

Accordingly, it is an object of the invention to provide a reflective type photographic print which has a uniform nonglare, transparent surface.

It is a further object of the invention to provide a reflective type photographic print having back curl.

It is another object of this invention to provide a photographic reflective print which resists deterioration when exposed to actinic light and atmospheric oxygen.

It is a further object of the invention to provide a method of preparing a reflective type photographic print having the above-mentioned properties.

Other objects, advantages, and features of the present invention will be apparent from a reading of the disclosure and the appended claims.

SUMMARY OF THE INVENTION

The method of preparing the nonglare reflective photographic print of the invention comprises the steps of removing a print from the developing solutions, placing on the image layer of the print a sheet of polyester film having a matte surface, removing any air which is entrapped between the image layer and the film, and heating the print-film composite a sufficient length of time so that the film adheres to the image layer. The article produced by the above-described method may be characterized as a reflective type print comprising a suitable support on which is coated an image layer comprising a photographic emulsion, and permanently bonded to the image layer a sheet of polyester film having a matte surface.

DETAILED DESCRIPTION OF THE INVENTION

The method of the invention is applicable to all reflective type photographic prints having a suitable supporting base onto which is deposited a light sensitive emulsion coating, with the exception of those emulsions which contain alkali soluble dye systems. The latter is commonly encountered in the so-called Polaroid type processes. Accordingly, throughout the specification and claims the term "image layer" refers to a photographic emulsion layer which does not contain an alkali mobility type dyeing system. The support material may be any material which is capable of having a photographic emulsion deposited on its surface. These include many types of paper products well known in the art. Other synthetic supports may also be used such as acetate films, polyester films, and the like.

The image layer emulsion contains the active photosensitive system of silver halide crystals dispersed throughout a continuous carrier of a water-permeable binder, usually gelatin. The layer may contain other chemicals well known in the art such as chemical sensitizing agents, coating aids, and the like. When the image layer is color sensitive, the image layer includes layers of suitable light-sensitive chemicals which make up the color dye system. The light-sensitized photographic papers comprising the image layer and the supporting material are commercially available and sold under various trade names. Especially good results of the invention have been obtained using Ektacolor Type C paper, a photographically sensitized paper which is a product of the Eastman Kodak Company.

The polyester film utilized in the invention is a film of transparent poly(ethylene terephthalate) having a matte surface on both sides of the film. The matte surface can be a characteristic of the surface of the polymeric film or, more preferably, the matte surface can be the result of a coating deposited on the surface of the film. Such coatings, and the methods of their application to the polyester film, are well known in the art. Especially good results are achieved with matte surface drafting film, a product prepared for use by draftsmen for ink and pencil drawings. This same film is also utilized in the photographic industry as the base (support material) for photographically sensitized emulsions. The polyester film is of a thickness of from about 2.5 to about 10 mils, preferably about 4 to about 7 mils. Especially good results have been obtained with a polyester film, Cronaflex U–C drafting film, a product of E. I. du Pont de Nemours and Company, of .004 inch thickness. This film is characterized by its fine matte surface, suitable for drafting applications.

Although it is not completely understood why the polyester film containing a matte surface provides a permanent bond when placed in contact with the image layer of the reflective type print, it is believed that the bond is caused by the chemical nature of the photographic emulsions. Virtually every type of photographic emulsion contains within its water-permeable binder certain chemicals which aid in the adherence of the image layer to the substrate. When the matte surface polyester film is placed in suitable contact with the image layer while the print is wet and heat is applied as discussed hereinbelow, a permanent bond is obtained between the surface of the image layer and matte surface film.

The method of the invention is extremely simple and straightforward. The photographic print is removed from the development processing solutions and while still wet is placed on a relatively nonabsorbent surface. It is essential to the invention that the polyester film be placed in contact with the photographic print prior to the time that it has dried a substantial length of time. The sheet of matte surface polyester film is then placed on top of the image layer of the photographic print. The size and shape of the polyester film can be such that it matches the configuration of the photographic print or, more preferably, the polyester sheet is oversize in relation to the print. After the polyester sheet is placed in contact with the print, any air which is trapped between the image layer and the sheet is removed by passing a roller over the surface of the matte film. Although a roller is preferred, any other method of slightly compressing the sheet onto the image layer of the wet print may be utilized, as long as air is efficiently excluded from its position between the film and the surface of the print. When oversized film is used, that portion of the polyester film over the lateral edges of the print may be trimmed as desired by any suitable means, such as a razor edge.

The composite wet photographic print-polyester film is then subjected to heat treatment. Preferably, the heat treatment is accomplished in a press which subjects the polyester film to a uniform temperature for a period of about a few seconds to about 5 minutes, preferably for a time period of between about 30 seconds to about 3 minutes. The amount of heat applied to the composite will be in the range of from 190° to 260° F., preferably from about 200 to about 230° F. The apparatus utilized to apply the heat treatment is not critical, although it is desirable that the heat be applied as uniformly as possible over the surfaces of the composite. A suitable apparatus comprises a photographic mounting press which has heating coils in the upper one half of the press surfaces.

After the photograph is subjected to the proper heat treatment, it is simply removed and dried in air at ambient temperatures until the photographic paper is completely dry.

The article of the invention is characterized by the extreme strength of the bond between the image layer and the polyester film. The film provides an air-impervious coating which prevents the passage of air onto the surface of the image layer thereby increasing its resistance to oxidative degradation. The article has a characteristic back curl, thereby enabling the print to be easily mounted for display purposes. The surface of the print is substantially nonglare while retaining almost complete transparency with respect to the quality of the pictorial image. The surface is entirely uniform with respect to the glare qualities and especially when under direct illumination there is not seen to be any substantial amount of reflection of light.

The method of the invention and the article produced thereby can better be understood from a reading of the following examples which illustrate the invention.

EXAMPLE I

A reflective photographic print was made by exposing a color negative to Kodak Ektacolor Type C paper. The exposed paper was subjected to a standard color development procedure comprising processing the print with solutions of developer, stop-fix, bleach, formalin fixer, and stabilizer. The wet color print was removed from the stabilizer solution and placed on a relatively flat nonabsorbent surface comprising paperboard.

A sheet of polyester film having a thickness of 4 mils (.004 inch) and a double matte surface was prepared by cutting the sheet so that the border thereof (periphery) was larger than the print. The polyester sheet was obtained from E. I. du Pont de Nemours & Co., Cronaflex U–C drafting film. This film has a fine matte drafting surface on each side.

The polyester sheet was laid on top of the moist print. A rubber roller was passed over the surface to bring the matte surface of the sheet in substantially continuous contact with the image layer. The roller thus removed air entrapped between the image layer of the print and the polyester film. Excess film was trimmed from the lateral edges of the print by using a conventional razor edge knife.

The composite wet photographic print-polyester film was then placed in photographic mounting press, manufactured by the Seal Corporation, a Model Masterpiece 350, and subjected to a temperature of 225° F. for a period of 2 minutes. The heat treatment caused the matte surface of the film which was in contact with the image layer of the print to firmly adhere to the image layer. The process was completed by removing the composite from the press and air drying until the photographic paper was completely dry. An attempt was made to peel off the film without success.

The color photograph prepared above was compared with two other reflection print color photographs of the prior art. The first was a conventional color print and the second being a conventional color print which had been treated three times with a nonglare spray, known in the art as a dulling spray or a transparent finish precolor spray. These acrylic resin base sprays are used to provide a nonglare finish to reflection prints. The comparison showed remarkable differences.

The reflection print composite of the invention is characterized by a uniform nonglare surface which is not seen to reflect a substantial amount of light when viewed under direct illumination. The film can be written on with pencil or ink. Conventional color treatments may be made directly on the surface of the polyester film. For example, where a color print is found to have a defect in the intensity of a color dye, or an area on its surface which has been disturbed in handling the print, the quality of the print may be upgraded by applying color inks and other dyes directly to the surface of the film. When smudged with dirt or grease, these substances can be removed easily with a gum or soft rubber eraser or with a damp cloth, various mild commercial cleaning agents, such as window cleaners, mild soap or detergent solutions, and the like. The composite has a characteristic "back curl" which is highly desirable.

Both the conventional print and the spray-treated photograph have "front curl." In addition, the conventional print has a highly glossy surface which reflects a substantial amount of light which strikes its surface. The spray-treated color print has a surface which reflects less light than the conventional print. However, the surface of the spray-treated print is seen to be nonuniform, thereby causing portions of the surface to reflect more light than other parts of the surface.

EXAMPLE II

The process of Example I above was utilized to prepare a nonglare black and white reflective print. Substantially the same results were obtained, the polyester film being firmly bonded to the image layer.

That which is claimed is:

1. In a reflection type photographic print comprising a suitable support material on the surface of which is deposited an image layer comprising a photographic emulsion, the improvement consisting essentially of, in contact with the image layer, a bonded sheet of poly(ethylene terephthalate) polyester film having a matte surface on both sides of the film, thereby imparting a uniform, non-glare protective surface to the print.

2. The article of claim 1 wherein the polyester film has a thickness in the range of about 3 to about 10 mils.

3. The article of claim 2 wherein the polyester film has a thickness in the range of about 4 to about 7 mils, and the improved print has back curl.

4. The article of claim 3 wherein said photograph is a color photograph.

5. The article of claim 1 wherein said photograph is a black and white photograph.

6. A method of preparing a reflection type photographic print having a support material on the surface of which is deposited an image layer and a protective sheet of polyester film in contact with the image layer comprising the steps of:

(1) removing said print from the developing solution,
(2) placing on the wet image layer of said print a sheet of poly(ethylene terephthalate) polyester film, said sheet having a matte surface on both sides,
(3) removing air which is entrapped between said polyester film and said image layer, and
(4) heating the photographic print-polyester sheet composite a sufficient length of time so that the polyester sheet adheres to the image layer.

7. A method according to claim 6 wherein the sheet of polyester film has a thickness of about 3 to about 10 mils.

8. A method according to claim 6 wherein step (3) is accomplished by passing a roller over the surface of said sheet and step (4) is accomplished by placing the composite in a photographic dry mounting press for a period of time in the range of from a few seconds to about 5 minutes at a temperature in the range of about 190° to about 260° F.

9. A method according to claim 8 wherein the step (4) is accomplished at a temperature in the range of from about 200° to about 230° F.

References Cited

UNITED STATES PATENTS

| | | | |
|---|---|---|---|
| 3,110,235 | 11/1963 | Kinnard | 96—119 |
| 3,413,171 | 11/1968 | Hannon | 161—6 |
| 3,457,661 | 7/1969 | Peters | 40—2.2 |
| 3,515,626 | 6/1970 | Duffield | 161—231 |
| 3,566,521 | 3/1971 | Conner | 40—2.2 |
| 2,706,686 | 4/1955 | Hilborn | 96—50 PL |
| 3,022,169 | 2/1962 | Heckelmann | 96—67 |
| 3,190,197 | 6/1965 | Pinder | 96—50 PL |
| 3,397,980 | 8/1968 | Stone | 96—50 PL |
| 3,411,907 | 11/1968 | Whitmore et al. | 96—67 |

FOREIGN PATENTS

| | | | |
|---|---|---|---|
| 1,153,249 | 8/1963 | Germany | 96—50 PL |
| 1,528,840 | 6/1968 | France | 96—50 PL |

NORMAN G. TORCHIN, Primary Examiner

J. R. HIGHTOWER, Assistant Examiner

U.S. Cl. X.R.

96—67; 161—6